Dec. 17, 1935.  W. E. GIBBS  2,024,520
SAW TOOTH
Filed Nov. 12, 1934
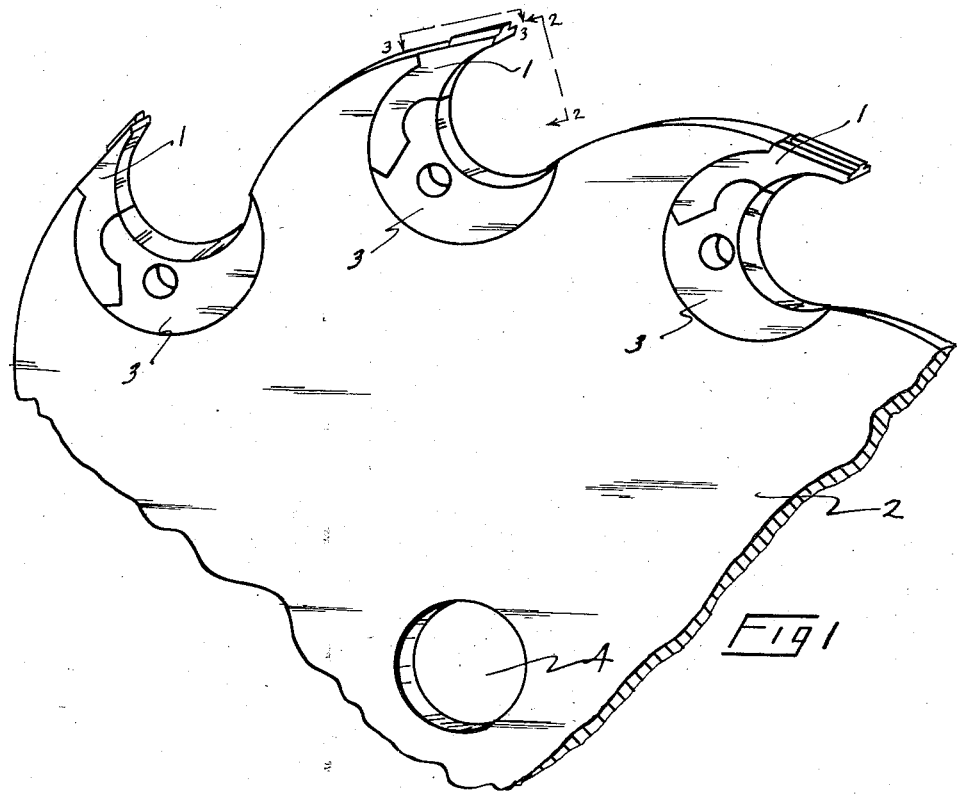
Fig 1
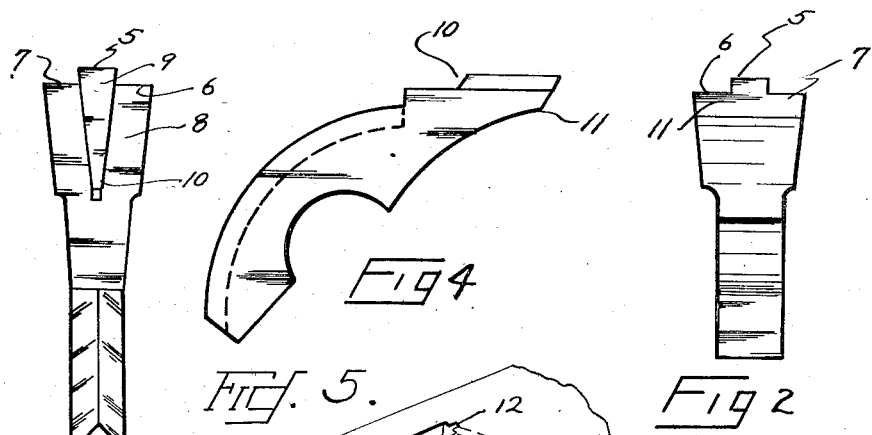
Fig 3    Fig 4    Fig 2
Fig. 5
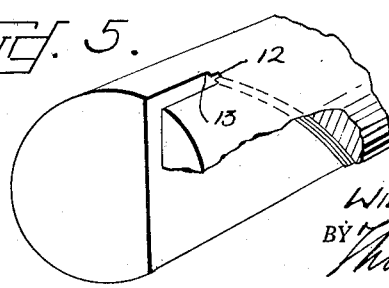
INVENTOR.
WILLIAM E. GIBBS
BY
ATTORNEYS.

Patented Dec. 17, 1935

2,024,520

UNITED STATES PATENT OFFICE 2,024,520

SAW TOOTH

William E. Gibbs, Portland, Oreg.

Application November 12, 1934, Serial No. 752,723

5 Claims. (Cl. 143—141)

My invention relates to improvements in saws and particularly to circular saws having removable or inserted teeth.

My invention primarily comprises a saw having teeth the cutting edge of which have radially spaced shoulders.

The primary object of my invention is to provide a saw, the teeth of which will remain sharp over a longer period of time.

A further object of my invention is to provide a form of saw tooth that will cut more easily, thus reducing the amount of power required for a given output of lumber; likewise decreasing the amount of load and wear upon the saw mill mechanism.

A still further object of my invention is to provide means in a saw whereby the lateral friction against the saw is reduced resulting in a saw that cuts more freely, more cleanly and with a marked reduction both in dust and in ragged kerfs.

A further object is the provision of a saw tooth which will cause a saw to run in a straight line regardless of the unequal wear on the cutting bits thereof.

With these and incidental objects in view, the invention consists in certain novel features of construction and combination of parts, the essential elements of which are set forth in the appended claims, and a preferred form of embodiment of which is hereinafter shown with reference to the drawing which accompany and form a part of this specification.

In the drawing:

Fig. 1 is a side elevation of a portion of a circular saw having teeth of my improved design in place therein and anchored by suitable shanks or holders.

Fig. 2 is a view of my improved saw tooth, taken along line 2—2 of Fig. 1, looking in the direction indicated.

Fig. 3 is a view of my improved saw tooth taken along line 3—3 of Fig. 1, looking in the direction indicated.

Fig. 4 is a side elevation of my improved saw tooth.

Fig. 5 is a perspective view showing the end of a log and the character of the sawcut formed by my device, a portion of the log being cut away in section.

Like reference characters refer to like parts throughout the several views.

I provide a plurality of saw teeth 1, adapted for insertion within a circular saw body 2, wherein they are retained by holders 3. I make no claim to any specific structure of inserted tooth saw, as these are of several varieties, all well known in the art to which my invention pertains. A hole 4 is disposed centrally of the saw body 2 whereby the saw body may be mounted upon a suitable mandrel for actuation.

It is to be understood that I do not wish to limit my invention to circular saws having inserted teeth, as my invention may also be applied to solid tooth circular saws and to band saws.

I preferably form the cutting edge of my improved saw tooth in segments, as shown in Fig. 2, where centrally disposed segment 5 is flanked by outside segments 6 and 7. The cutting edges of the outside segments 6 and 7 are backed by a plane surface 8 common to both segments, while the cutting edge of segment 5 is backed by a plane surface 9 which is parallel to and elevated above the surface 8. The width of the plane surface 8 is greatest adjacent the cutting edges of segments 6 and 7, and tapers back therefrom for clearance. The plane surface 9 likewise tapers from the cutting edge of segment 5 towards heel 10. The cutting edges of all of the segments are formed by the intersection with parallel surfaces 8 and 9 of surface 11, which is oblique thereto. The keenness of the cutting edges is maintained by grinding the surface 11. The angle between surface 11 and surface 8 is materially less than a right angle, as is therefore the angle between surface 11 and surface 9. The cutting edge of segment 5 is therefore materially in advance of the cutting edges of segments 6 and 7.

It is thus evident that in operation the cutting edge of segment 5 produces a comparatively shallow channel as shown at 12 in Fig. 5, while the cuting edges of segments 6 and 7 remove stock on either side of the channel 12 to form the kerf 13. The removal of stock from the channel 12 slightly in advance of the removal of the remaining stock from the kerf 13 permits the operation of the saw with less power than is required by a conventional saw. The breaking up of the chip results in longer intervals of use of the saw between grindings, enables the saw to run cooler and produces smoother cuts.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What I claim is:

1. An insert tooth for circular saws having projecting from its cutting edge an intermediate lip whose cutting edge operates at a greater radius than do the lateral portions of the cutting edge of the tool.

2. An insert tooth for circular saws whose main cutting edge is wider than the body of the insert and having projecting therefrom an advanced cutting edge which is integral therewith and which is disposed between the sides of the main cutting edge.

3. An insert tooth for circular saws consisting of a body having means for attaching same to a saw blade, the tip of said insert constituting the main cutting edge which is wider than the body of the insert, the outermost face of which is substantially straight and a rib formed between the sides of said straight face terminating in an extension beyond the main cutting edge and in advance thereof.

4. A insert tooth for circular saws having means for attaching same to a saw blade, the outermost side of the insert being straight, one end of which forms the main cutting edge of the insert, a rib formed along the center of said straight side and projecting beyond the main cutting edge of the insert, the inner side of the main cutting edge coinciding with the inner side of the extending portion of the rib.

5. An insert tooth for circular board saws having its outer edge tangent to the curve of the saw tooth and having the tip of said tangent portion wider than the saw tooth and constituting the main cutting edge thereof, said tangent portion having a longitudinal rib formed along its outer side extending beyond said main cutting edge and constituting a guide for the main cutting edge as well as providing a means for relieving the pressure from the chips between the time they are formed and the time they are removed from the cut.

WILLIAM E. GIBBS.